(12) United States Patent
Cruz (10) Patent No.: US 7,928,609 B2
(45) Date of Patent: Apr. 19, 2011

(54) SHOCK-PROOF ELECTRICAL OUTLET

(75) Inventor: Paul Cruz, Del Mar, CA (US)

(73) Assignee: International Safety & Development, LLC, El Cajon, CA (US)

( * ) Notice: Subject to any disclaimer, the term of this patent is extended or adjusted under 35 U.S.C. 154(b) by 1169 days.

(21) Appl. No.: 11/542,954

(22) Filed: Oct. 3, 2006

(65) Prior Publication Data

US 2008/0094769 A1    Apr. 24, 2008

(51) Int. Cl.
  *H02J 11/00*    (2006.01)
(52) U.S. Cl. ....................................... 307/326
(58) Field of Classification Search .................. 307/326, 307/125, 117, 116; 361/42, 2; 335/18
  See application file for complete search history.

(56) References Cited

U.S. PATENT DOCUMENTS

| | | | |
|---|---|---|---|
| 2,789,255 A | | 4/1957 | Mekler |
| 2,937,322 A | | 5/1960 | Nixon |
| 3,115,874 A | | 12/1963 | Roberts |
| 3,158,791 A | | 11/1964 | Deneen, Jr. et al. |
| 3,184,651 A | | 5/1965 | Albosta |
| 3,280,375 A | | 10/1966 | Jensen |
| 3,886,434 A | | 5/1975 | Schreiner |
| 4,077,056 A | * | 2/1978 | Galiana ............................ 361/50 |
| 4,447,844 A | * | 5/1984 | Schossow et al. ............... 361/77 |
| 4,706,153 A | | 11/1987 | Sainomoto et al. |
| 4,853,821 A | | 8/1989 | Lewis |
| 4,888,660 A | | 12/1989 | Bartelink |
| 4,947,278 A | * | 8/1990 | Nichols, III ...................... 361/46 |
| 4,948,044 A | | 8/1990 | Cacciatore |
| 5,003,486 A | | 3/1991 | Hendel et al. |
| 5,019,935 A | | 5/1991 | Nakamura |
| 5,069,632 A | | 12/1991 | Avitan |
| 5,151,841 A | | 9/1992 | Knights |
| 5,267,116 A | | 11/1993 | Avitan |
| 5,347,095 A | | 9/1994 | Zeder |
| 5,426,552 A | | 6/1995 | Avitan |
| 5,485,340 A | | 1/1996 | Avitan |
| 5,737,161 A | | 4/1998 | Thomas |
| 5,892,644 A | | 4/1999 | Evans et al. |
| 5,920,452 A | | 7/1999 | Sullivan |
| 5,946,180 A | * | 8/1999 | Simpson ........................ 361/93.3 |
| 5,988,516 A | | 11/1999 | Gilmour |
| 6,049,143 A | * | 4/2000 | Simpson et al. .............. 307/126 |
| 6,100,607 A | * | 8/2000 | Olivieri et al. ................. 307/125 |
| 6,118,639 A | | 9/2000 | Goldstein |
| 6,307,482 B1 | | 10/2001 | Le Bel |

(Continued)

FOREIGN PATENT DOCUMENTS

DE     38 44 176 A1    7/1990

(Continued)

OTHER PUBLICATIONS

PCT International Search Report (mailed Jun. 29, 2007), 3 pages.

(Continued)

*Primary Examiner* — Albert W Paladini
(74) *Attorney, Agent, or Firm* — Knobbe Martens Olson & Bear, LLC (57) ABSTRACT

The present invention relates to a shock-proof electrical output device, which comprises a power outlet having a positive and a negative terminal, a voltage converter with a high voltage input and a low voltage output, a current monitoring relay device, a latching relay device, and a changeover relay device.

23 Claims, 13 Drawing Sheets

U.S. PATENT DOCUMENTS

| | | |
|---|---|---|
| 6,548,916 B1 | 4/2003 | Kanazawa et al. |
| 6,552,888 B2 * | 4/2003 | Weinberger .................... 361/57 |
| 6,717,781 B2 | 4/2004 | Xu et al. |
| 6,829,124 B2 * | 12/2004 | Leopold et al. ................. 361/42 |
| 6,891,454 B1 | 5/2005 | Naito et al. |
| 7,009,859 B2 | 3/2006 | Chen et al. |
| 7,224,086 B2 | 5/2007 | Germagian et al. |
| 7,400,476 B1 * | 7/2008 | Hull, Jr. .......................... 361/42 |
| 2002/0097546 A1 | 7/2002 | Weinberger |
| 2005/0128043 A1 | 6/2005 | Ying |
| 2005/0131552 A1 | 6/2005 | Yuan |
| 2008/0049367 A1 | 2/2008 | Carson et al. |

FOREIGN PATENT DOCUMENTS

| | | |
|---|---|---|
| EP | 0 348 128 A | 12/1989 |
| EP | 0384881 A | 8/1990 |
| EP | 0683927 | 11/1995 |
| JP | 2006/296111 | 10/2006 |
| WO | WO 93/09634 | 5/1993 |
| WO | WO 94/17573 | 8/1994 |
| WO | WO 2008/082636 A1 | 12/2007 |

OTHER PUBLICATIONS

PCT Written Opinion of the International Searching Authority (mailed Jun. 29, 2007), 7 pages.

International Search Report and Written Opinion dated Jun. 18, 2007 for International Patent Application No. PCT/US2006/039559, in 10 pages.

International Search Report dated Jan. 10, 2008, for International Patent Application No. PCT/US2007/021367, in 1 page.

International Preliminary Report on Patentability, dated Apr. 7, 2009, including Written Opinion of the International Searching Authority, dated Jan. 10, 2008, for International Patent Application No. PCT/US2007/021367, in 4 pages.

European Office Action dated Sep. 23, 2009 for European Application No. 06 816 635.4, in 5 pages.

* cited by examiner

SHOCK-PROOF ELECTRICAL OUTLET

FIELD OF THE INVENTION

This invention relates generally to shock-proof electrical output devices and methods, and more particularly to shock-proof electrical output devices and methods that distinguish between an actual electrical load and a false load created by living beings in contact with the output of a device according to this invention, high voltage being applied at the output only when an actual electrical load is presented at same by an electrical device.

BACKGROUND OF THE INVENTION

Electrical receptacle outlets in walls and floors present serious hazards to the public. The U.S. Consumer Product Safety Commission (CPSC) estimates that 3,900 injuries associated with electrical receptacle outlets are treated in hospital emergency rooms each year. Approximately a third of these injuries occur when young children insert metal objects, such as hair pins and keys, into the outlet, resulting in electric shock or burn injuries to the hands or fingers, and, in many instances, death. CPSC also estimates that electric receptacles are involved in 5,300 fires annually, which claim, on average, 40 lives and injure 110 consumers. Thus, there is an urgent need to develop a cost-effective and shock proof electrical supply outlet that is able to distinguish an electrical device from a human being to prevent unnecessary physical suffering and death as well as economic losses.

SUMMARY OF THE INVENTION

The present invention provides a shock-proof electrical output device that comprises a power outlet having a positive and a negative terminal; a voltage converter with a high voltage input having a positive and negative terminal, and a low voltage output having a positive and negative terminal; a current monitoring relay device; a latching relay device; and a changeover relay device. The electrical output device further comprises a current overload protection circuit.

The latching relay device of the present invention comprises a trigger button and a reset button. The latching relay device further has three or more contacts, such as a first contact, a second contact, and a common contact. The common contact of the latching relay device is in communication with the low voltage output of the voltage converter.

The changeover relay device of the present comprises a switch, a first set, a second set, and a third set of contacts. Each set of contacts have a first contact, a second contact, and a common contact.

In one embodiment, the current monitoring relay device comprises a switch, a first contact and a common contact. The first contact of the first set of the changeover relay device is in communication with the trigger button, the second contact is in communication with the positive terminal of a high voltage power line, and the common contact is in communication with the negative terminal of the outlet. The second contact of the second set of the changeover relay is in communication with the first contact of the current monitoring relay device and the common contact is in communication with the reset button of the latching relay device. The first contact of the third set of the changeover relay is in communication with the negative terminal of the high voltage power line and the common contact is in communication with the positive terminal of the low voltage output. The switch of the changeover relay device is in communication with the second contact of the latching relay device.

In another embodiment, the current monitoring relay device is a voltage transformer with a high voltage inlet and low voltage outlet. The high voltage inlet is in communication with the positive terminal of the power outlet. The first contact of the first set of the changeover relay device is in communication with the trigger button, the second contact is in communication with the positive terminal of a high voltage power line, and the common contact is in communication with the negative terminal of the outlet. The second contact of the second set of the changeover relay is in communication with the low voltage output outlet of the current monitoring relay device and the common contact is in communication with the reset button of the latching relay device. The first contact of the third set of the changeover relay is in communication with the negative terminal of the high voltage power line and the common contact is in communication with the positive terminal of the low voltage output of the voltage converter. The switch of the changeover relay device is in communication with the second contact of the latching relay device.

In an alternative embodiment of the present invention, the shock-proof electrical output device comprises a power outlet having a positive and a negative terminal; a voltage converter with a high voltage input having a positive and negative terminal, and a low voltage output having a positive and negative terminal; a current monitoring relay device; and a control relay device which serves as both latching relay and a changeover relay device.

The shock-proof electrical output device may have a variety of applications, such as use in a circuit breaker box, a power supply strip, and an extension cord.

When reading the detailed description of the invention that follows the brief description of the drawings, please note that high voltage refers to voltages in a range of approximately to 30 VAC to 600 VAC (intended to encompass all voltages employed to power various electrical appliances from electrical outlets inside and outside of residences and commercial buildings throughout the world), while low voltages referred to voltages in the range of just above zero up to 30 V, the low voltages being either DC or AC. It should also be borne in mind when reading the detailed description of the invention that human beings present very high (in the megaohms) of resistance when grasping wires with the fingers of dry hands (the resistance becoming somewhat less when the fingers are sweaty or bloody); therefore, at the low voltages present at the outlet in this invention when no electrical draw from an electrical appliance in use, no appreciable current will flow through a human in contact with the outlet of the invention in the low-voltage, no-load mode. This can most readily be appreciated by noting that Ohm's law ($V=IR$), in which V represents voltage, I represents current, and R represents resistance (or impedance), can be manipulated to give $I=V/R$. Thus, given the low voltage present at the shock-proof outlet of the electrical output device of the instant invention in the no load mode, combined with the above-mentioned fact that a human being inherently present comparatively high resistance or impedance (even when grasping wires with sweaty or bloody fingers) as compared to the virtually zero impedance presented by an electrical appliance in use, means that the current (the ratio of voltage to impedance) will not be large enough to harm a human being in contact with the shock-proof outlet of the instant invention. Therefore, at most, truly negligible (read: virtually imperceptible) currents will flow through the human, certainly not currents in the double digit milliamps (or higher) that can present an electrocution hazard.

BRIEF DESCRIPTION OF THE DRAWINGS

The accompanying drawings illustrate the present invention. In such drawings.

DETAILED DESCRIPTION OF THE INVENTION

Figure 1:
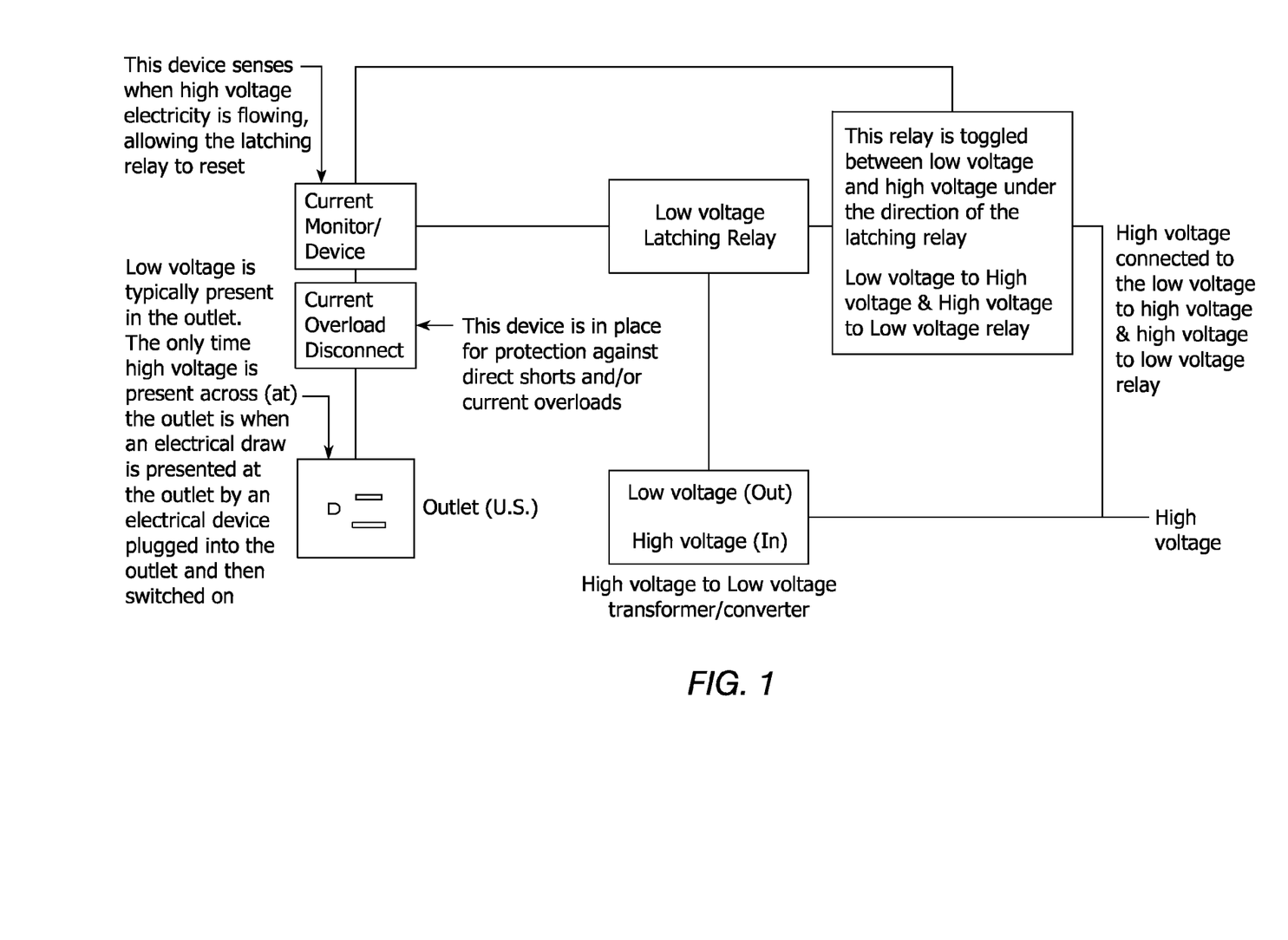
FIG. 1 is a block diagram schematic of the shock-proof electrical output device that includes explanatory text.
Figure 2A:
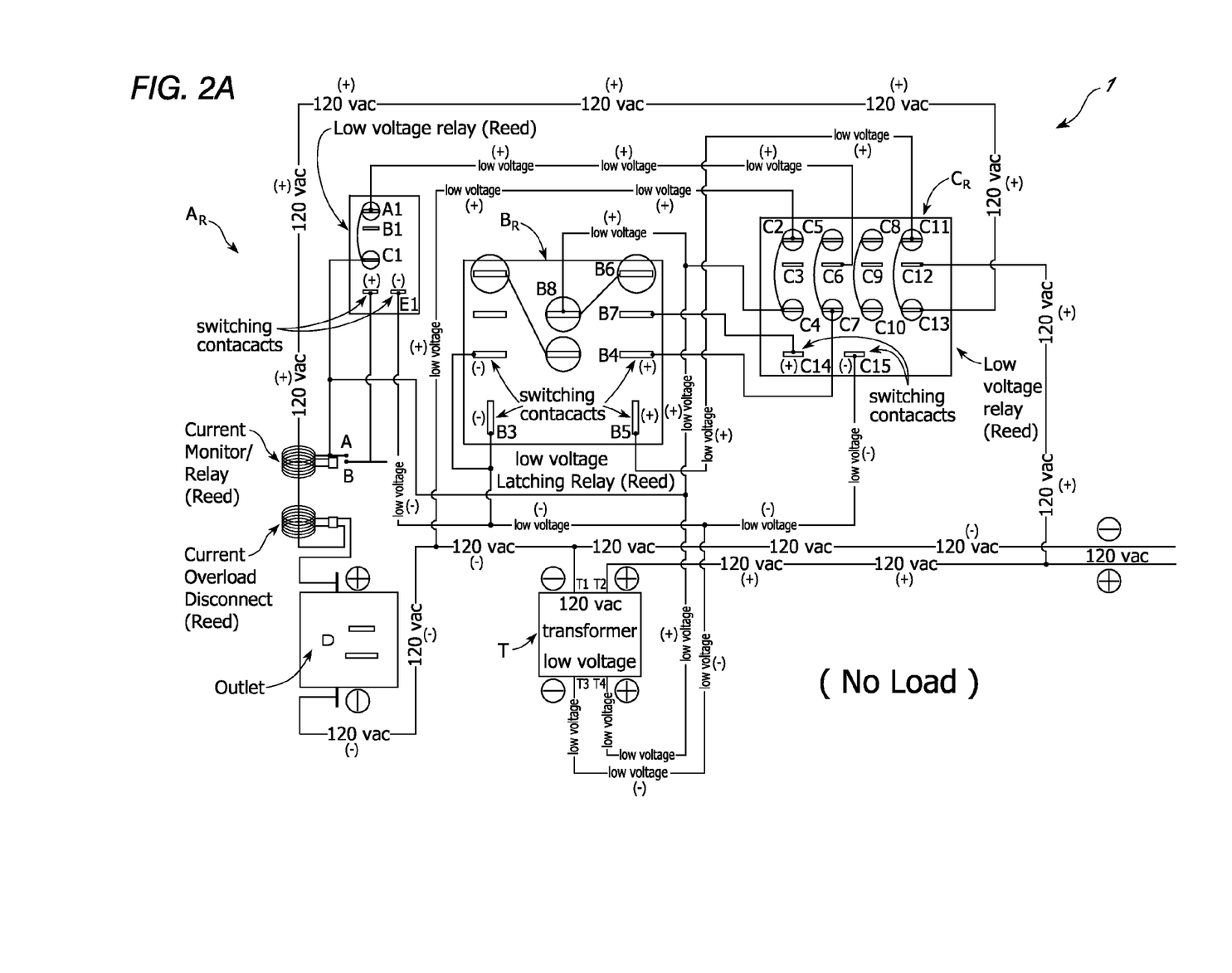
FIG. 2A is an electrical schematic of an embodiment of the shock-proof electrical output device in the no load mode, comprising, among other elements, three separate reed relays and a coil current monitor reed relay.
Figure 2B:
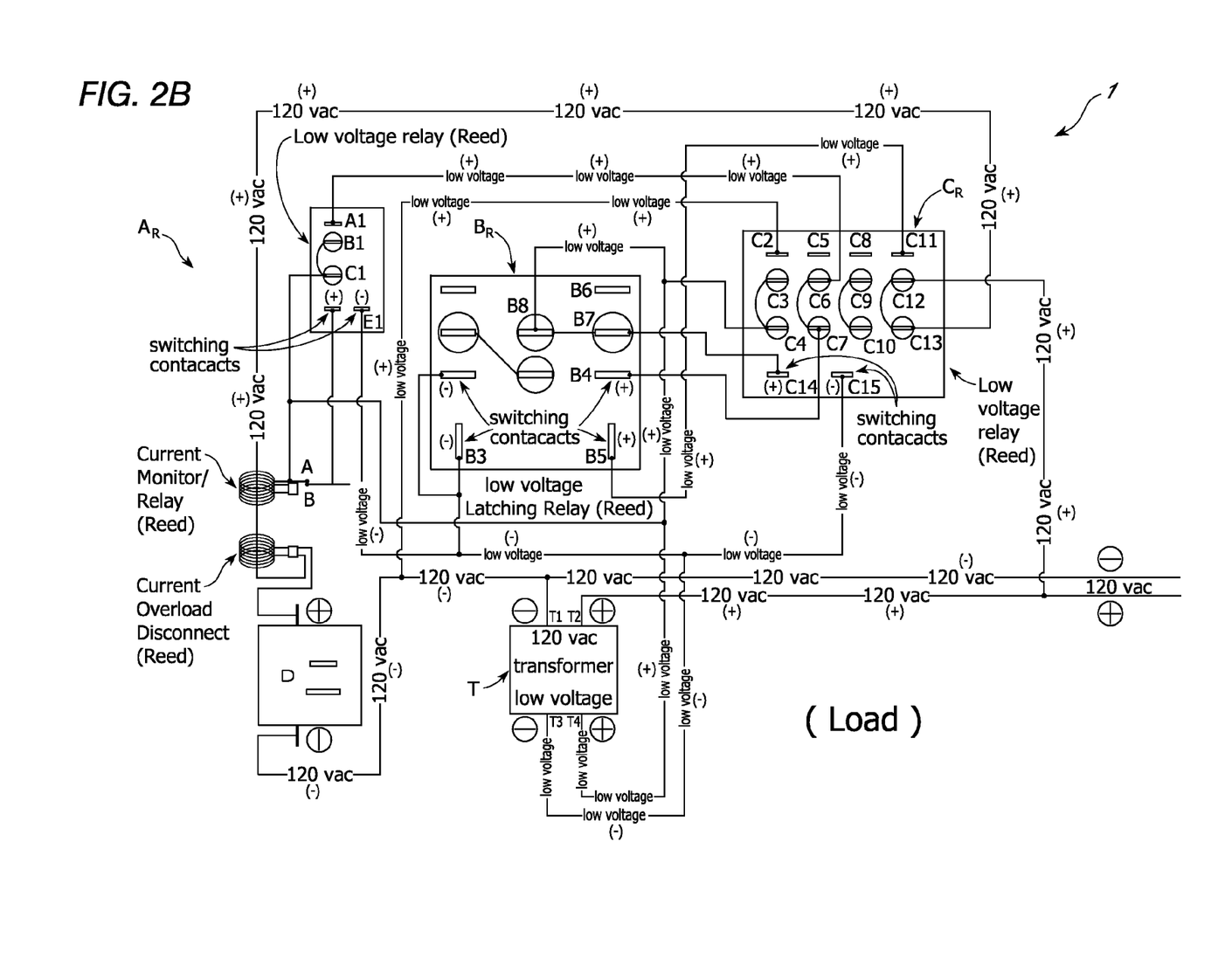
FIG. 2B is an electrical schematic of the embodiment of the shock-proof electrical output device depicted in FIG. 2A in the load mode.
Figure 3A:
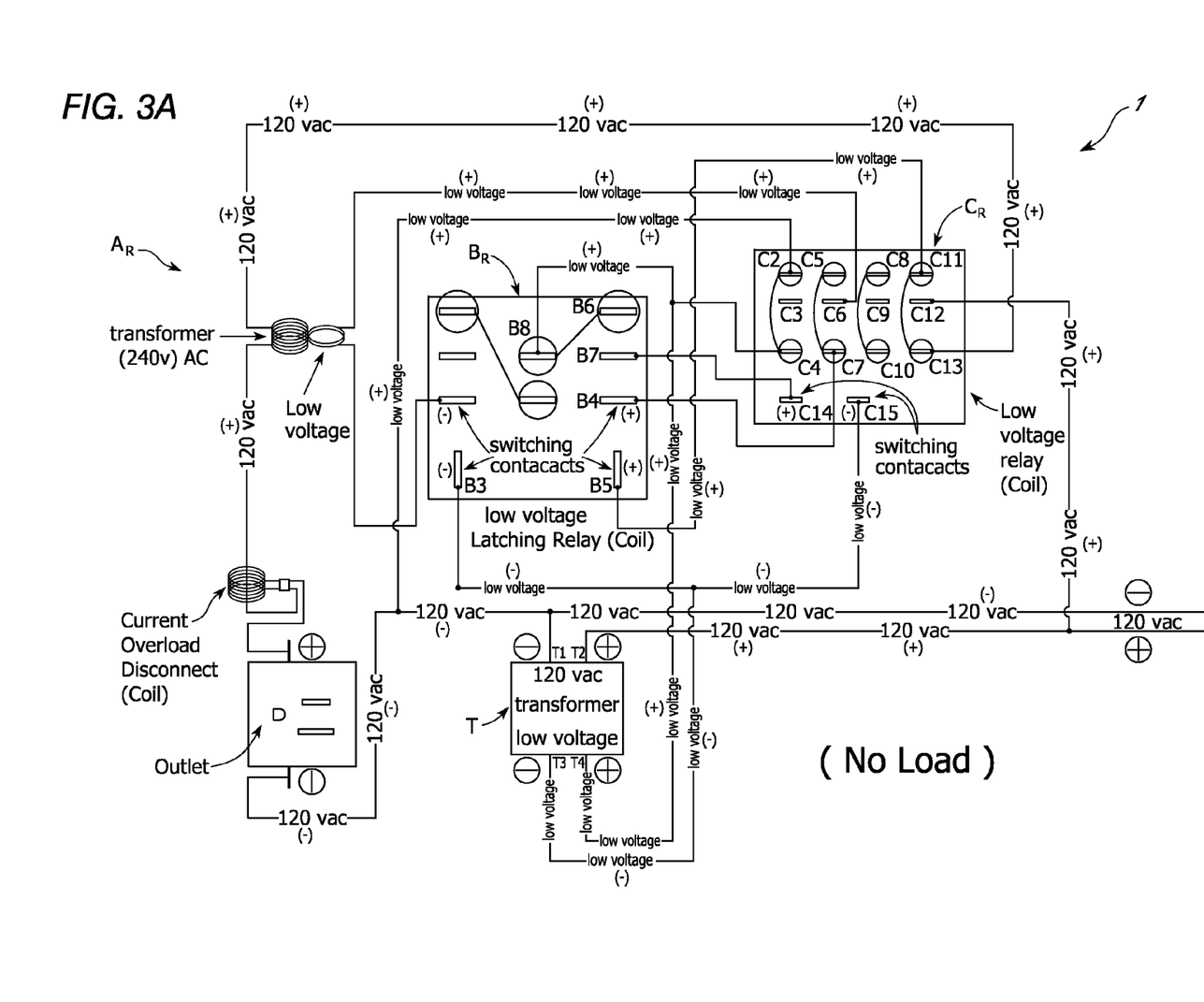
FIG. 3A is an electrical schematic of an embodiment of the shock-proof electrical output device in the no load mode, comprising, among other elements, a low voltage coil latching relay, a low- to high-voltage/high- to low-voltage coil relay and a pair of transformers functioning as a current monitor.
Figure 3B:
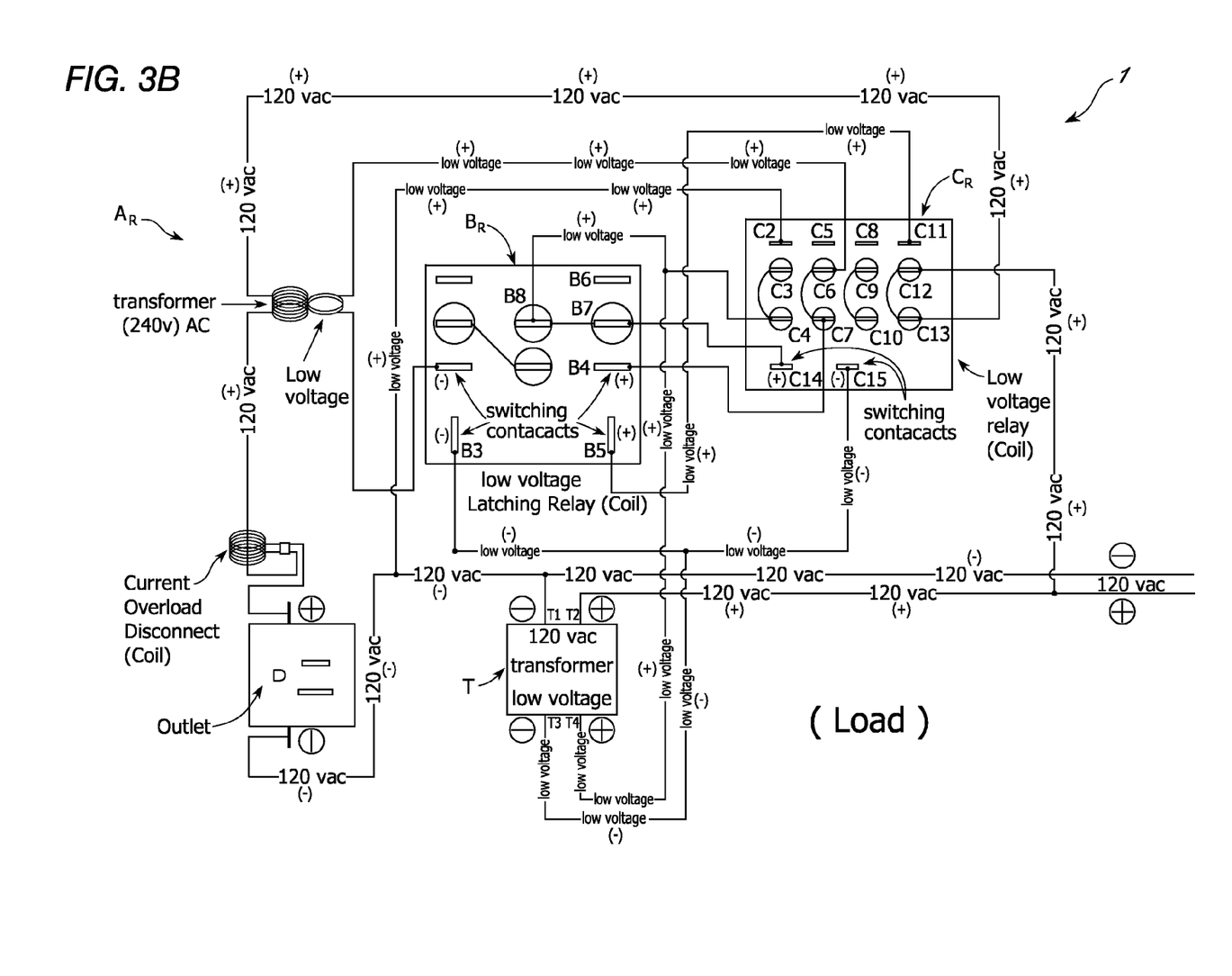
FIG. 3B is an electrical schematic of the embodiment of the shock-proof electrical output device depicted in FIG. 3A in the load mode.
Figure 4A:
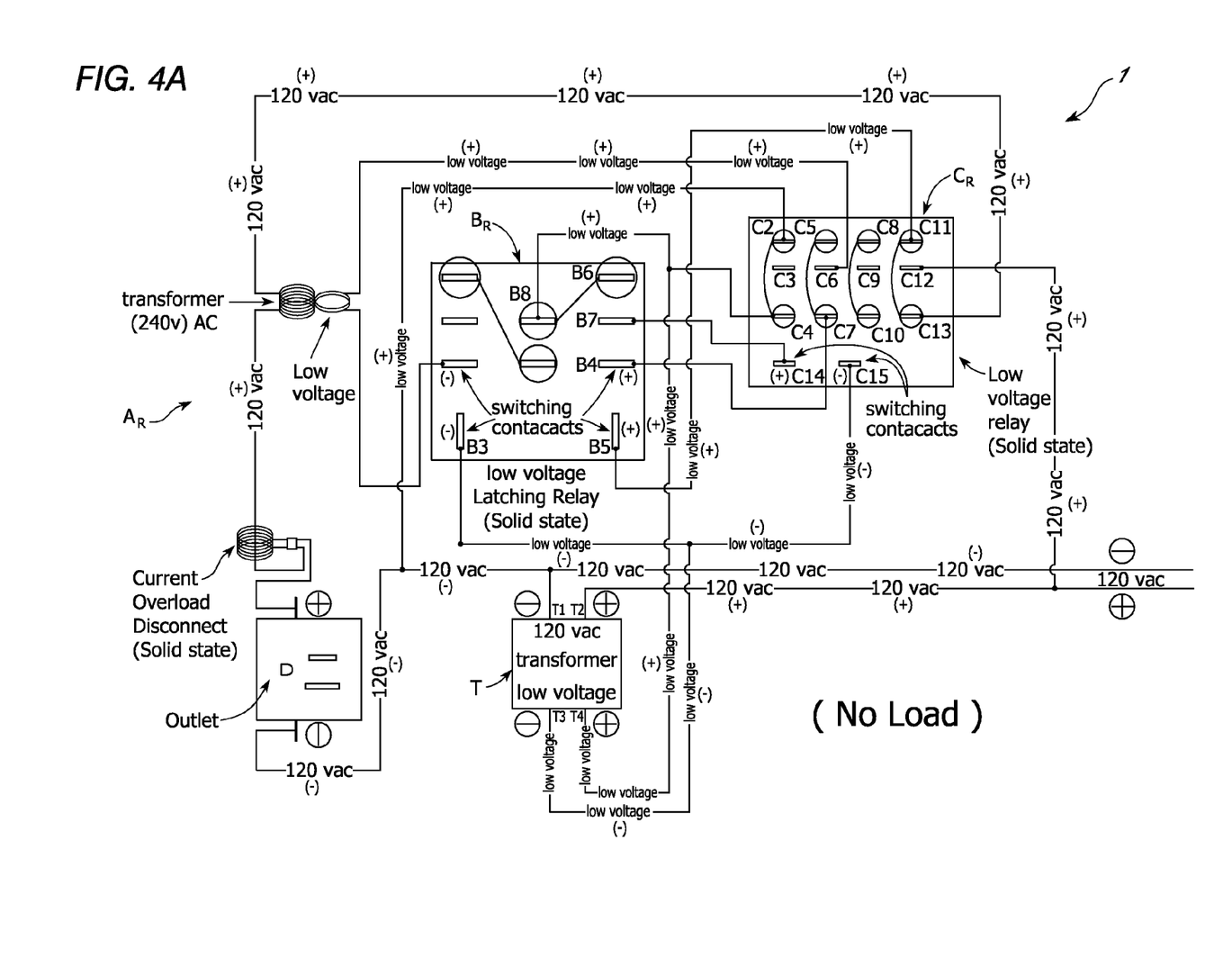
FIG. 4A is an electrical schematic of an embodiment of the shock-proof electrical output device in the no load mode, comprising, among other elements, a low voltage solid state latching relay, a low- to high-voltage/high- to low-voltage solid state relay and a pair of transformers functioning as a current monitor.
Figure 4B:
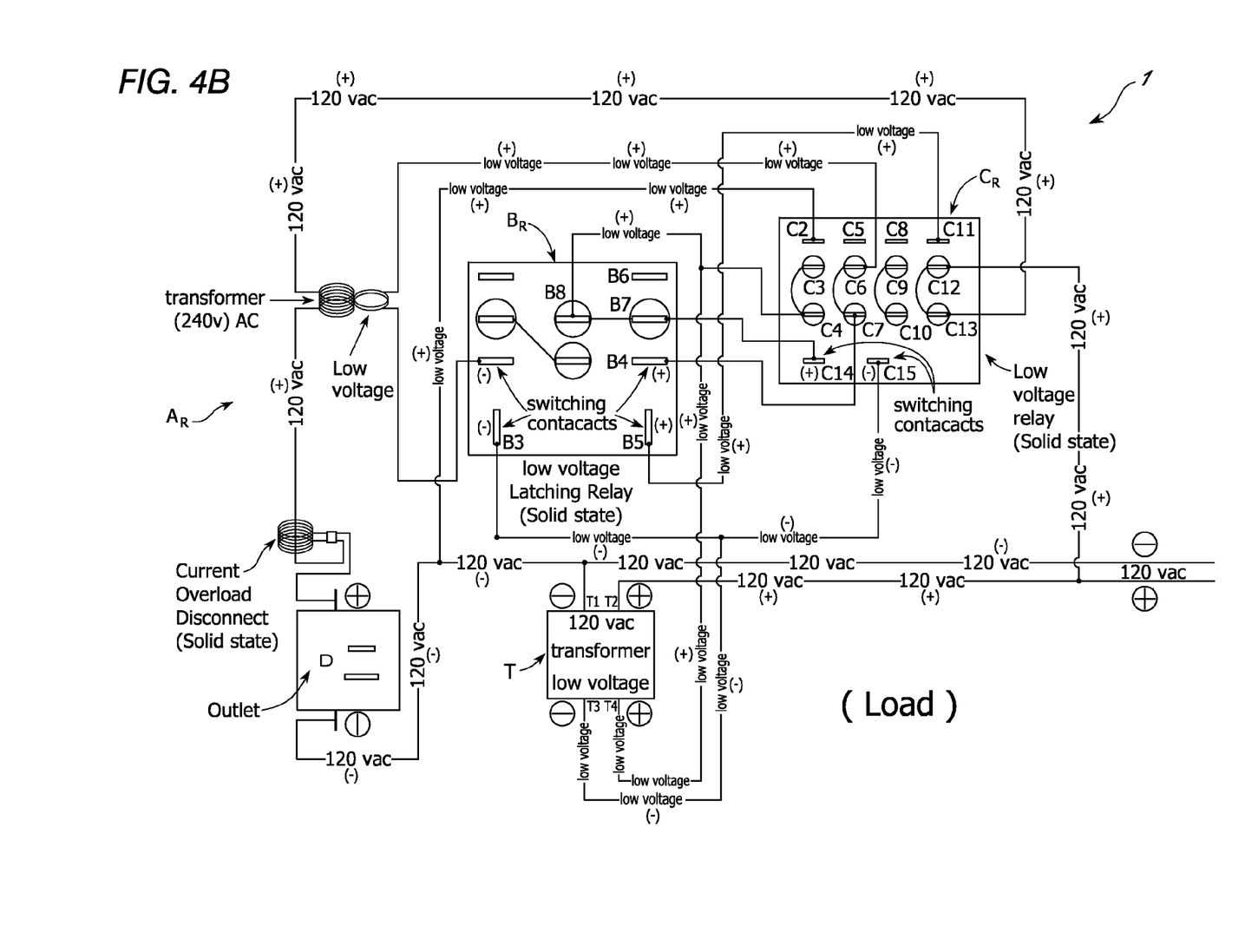
FIG. 4B is an electrical schematic of the embodiment of the shock-proof electrical output device depicted in FIG. 4A in the load mode.
Figure 5A:
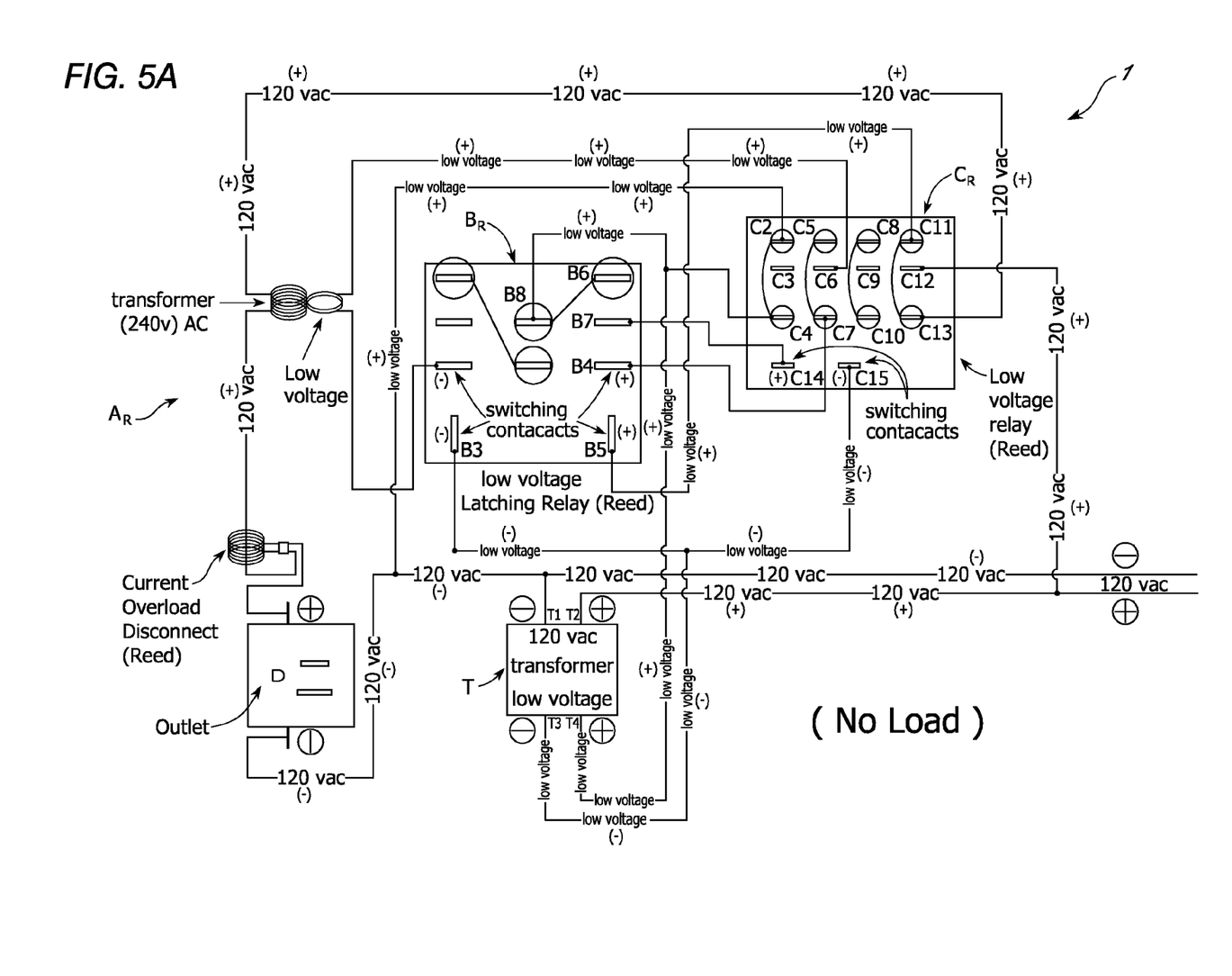
FIG. 5A is an electrical schematic of an embodiment of the shock-proof electrical output device in the no load mode, comprising, among other elements, a low voltage reed latching relay, a low- to high-voltage/high- to low-voltage reed relay and a pair of transformers functioning as a current monitor.
Figure 5B:
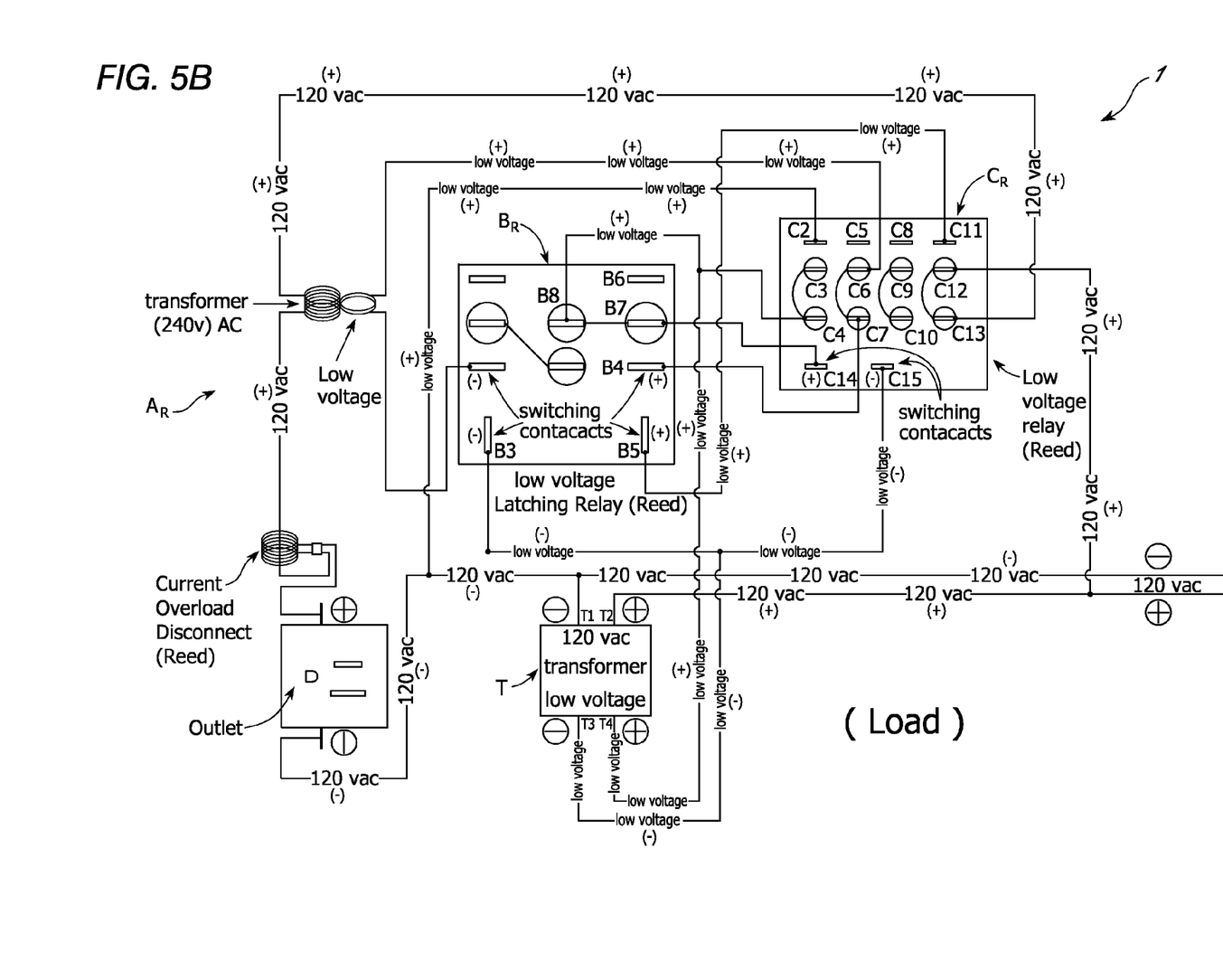
FIG. 5B is an electrical schematic of the embodiment of the shock-proof electrical output device depicted in FIG. 5A in the load mode.
Figure 6A:
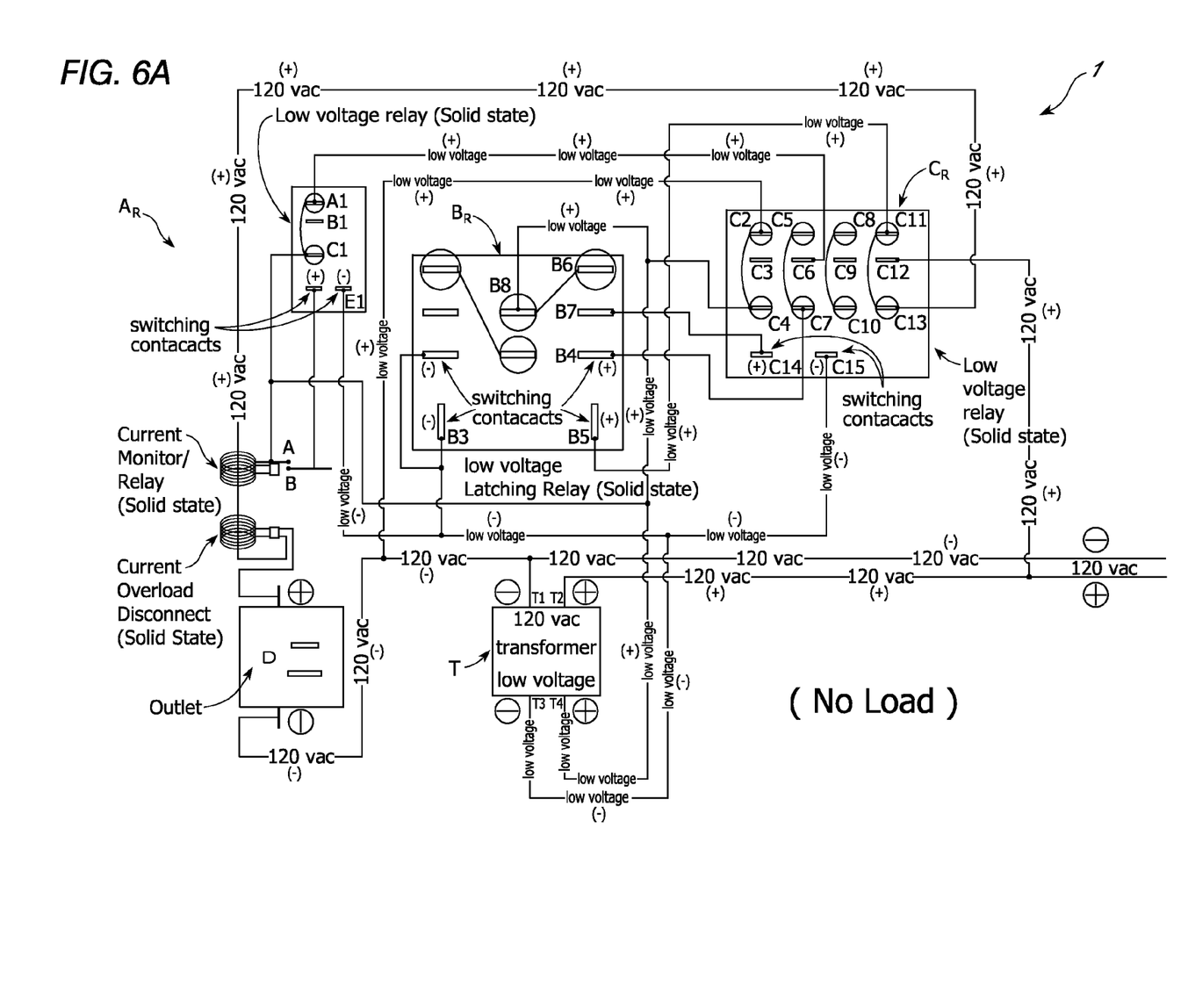
FIG. 6A is an electrical schematic of an embodiment of the shock-proof electrical output device in the no load mode, comprising, among other elements, three separate solid state relays and a coil current monitor solid state relay.
Figure 6B:
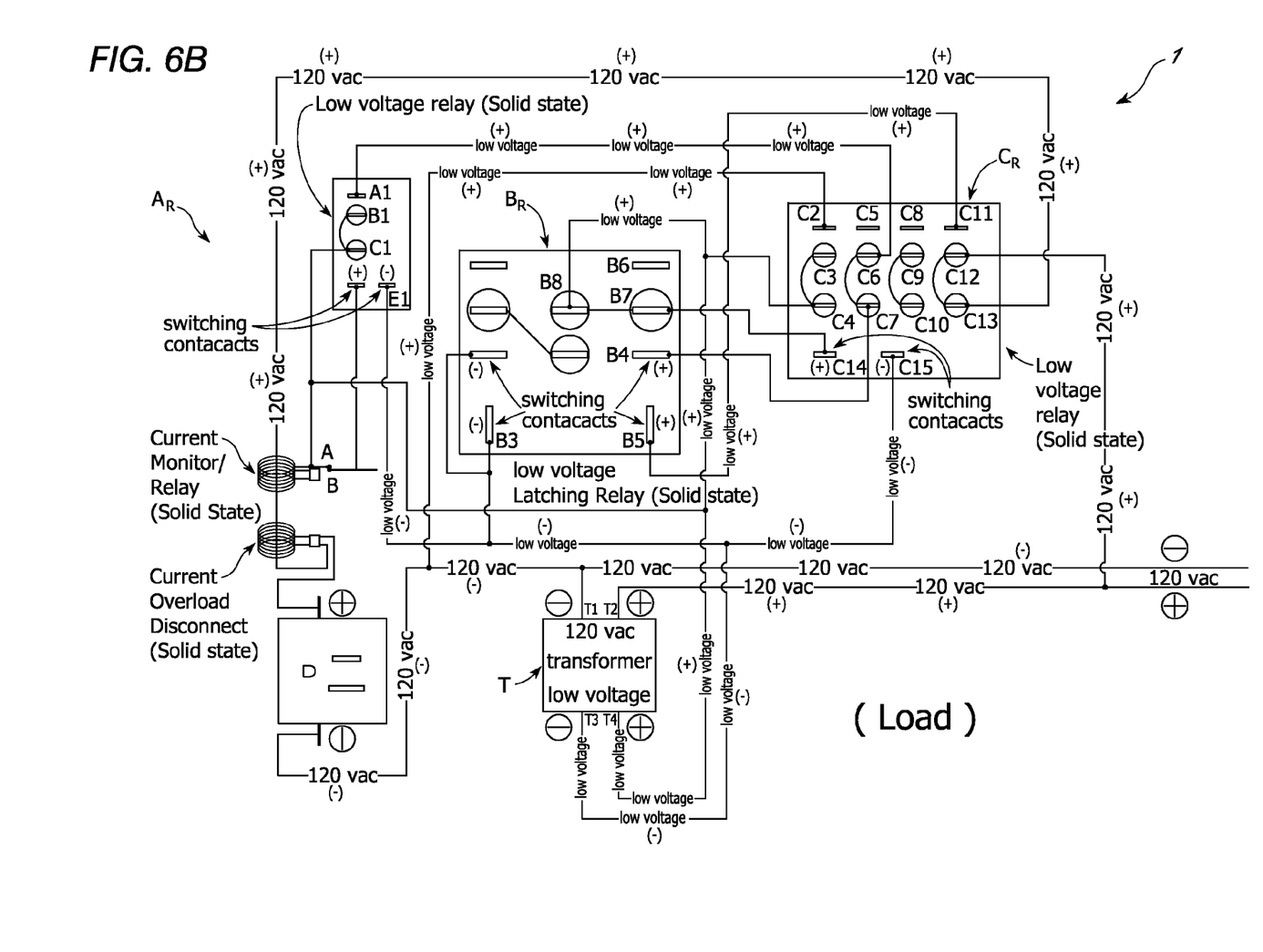
FIG. 6B is an electrical schematic of the embodiment of the shock-proof electrical output device depicted in FIG. 6A in the load mode.
Figure 7A:
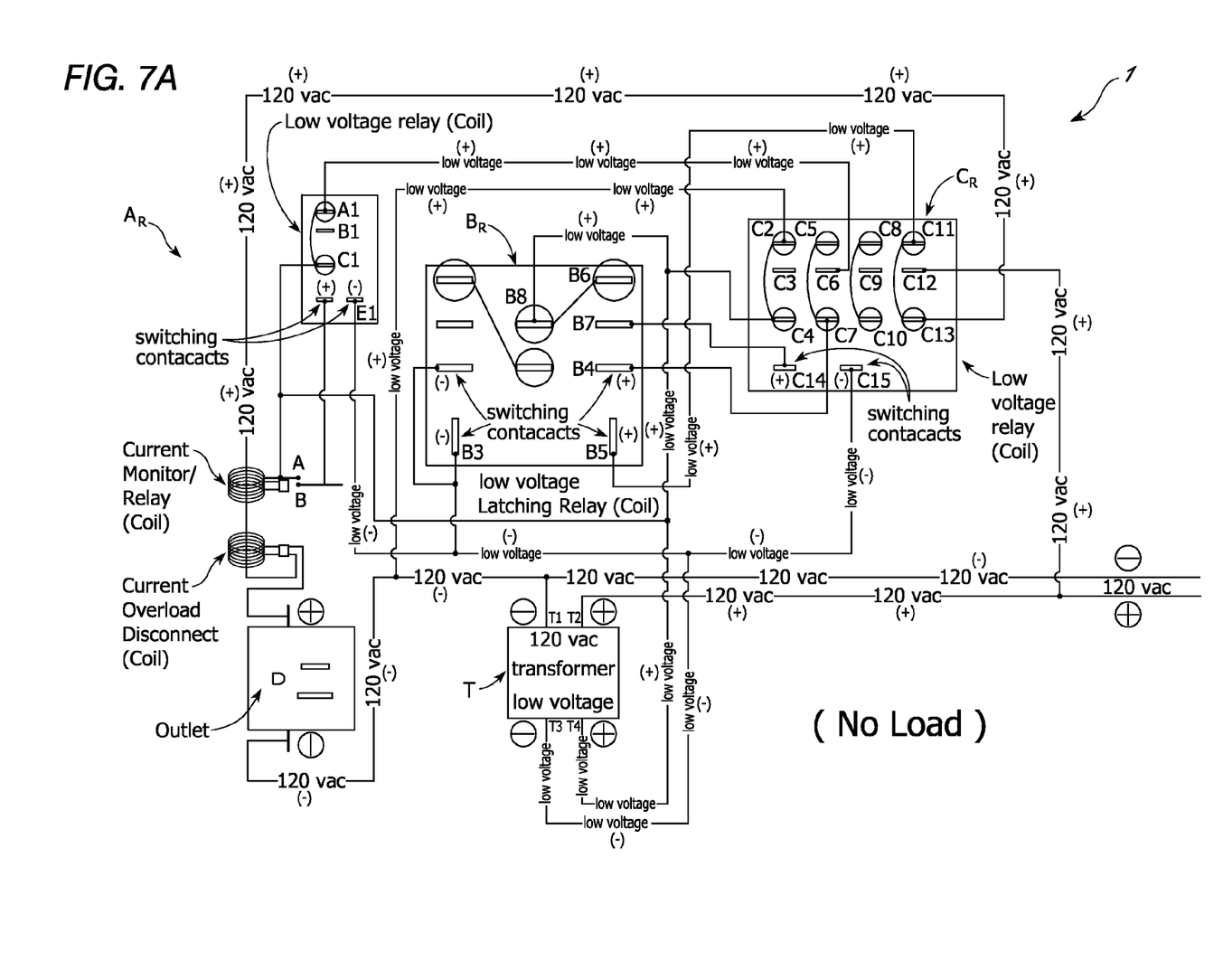
FIG. 7A is an electrical schematic of an embodiment of the shock-proof electrical output device in the no load mode, comprising, among other elements, a low voltage coil latching relay, a low- to high-voltage/high- to low-voltage coil relay.
Figure 7B:
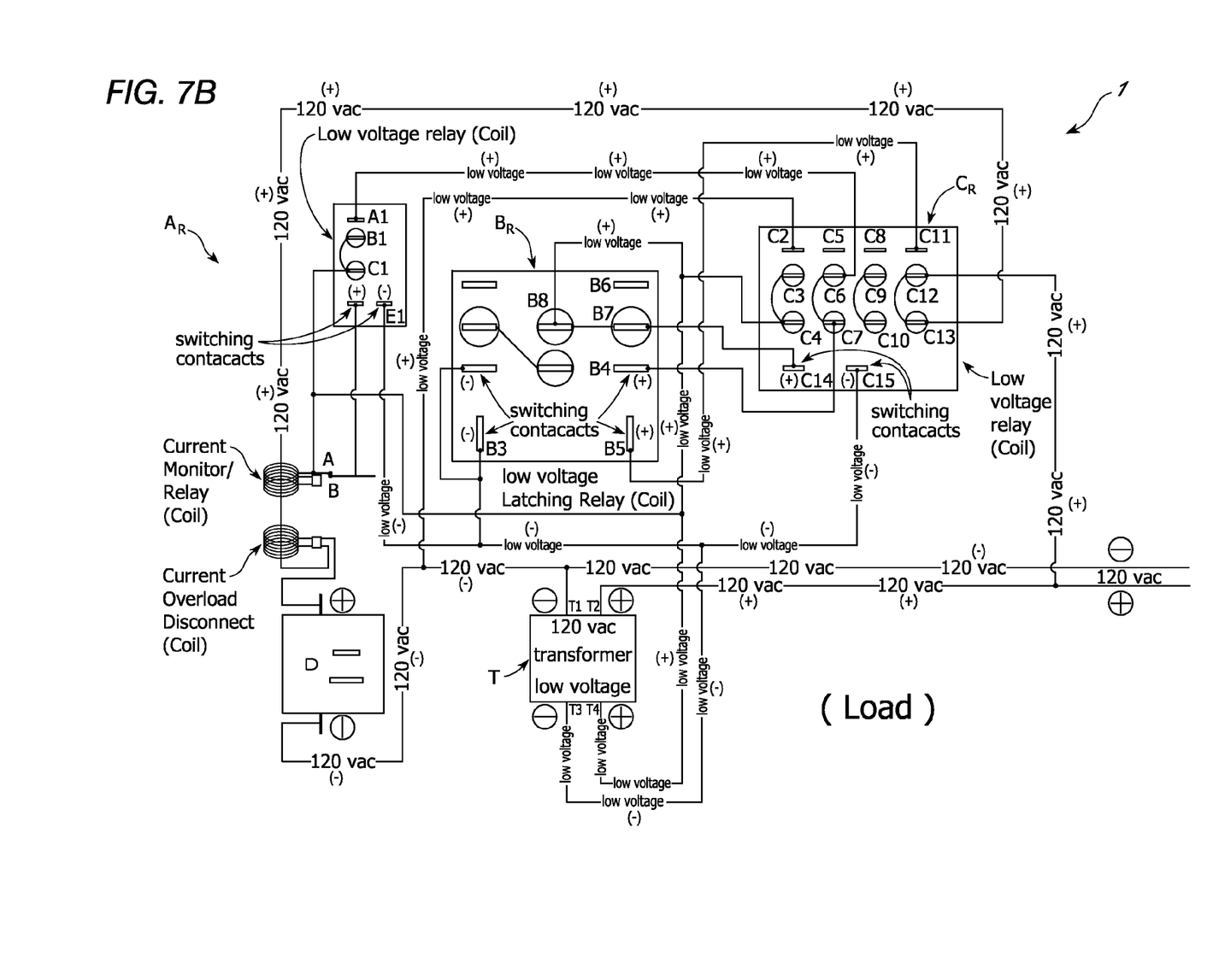
FIG. 7B is an electrical schematic of the embodiment of the shock-proof electrical output device depicted in FIG. 7A in the load mode.

The present invention provides a shock-proof electrical output device 1, which comprises a power outlet O having a positive H1 and a negative terminal H2; a voltage converter T with a high voltage input having a positive T2 and negative terminal T1, and a low voltage output having a positive T4 and negative terminal T3; a current monitoring relay device $A_R$; a latching relay device $B_R$; and a changeover relay device $C_R$. Suitable voltage converters include a transformer or a solid-state step-down voltage converter. FIGS. 2A-7B show electrical schematics of embodiments of the shock-proof electrical output device 1. Like elements among the embodiments are referenced with like numerals.

In operation, the shock-proof electrical output device 1 has two different modes, a load mode, shown in FIGS. 2A, 3A, 4A, 5A, 6A, and 7A, and a non-load mode, shown in FIGS. 2B, 3B, 4B, 5B, 6B, and 7B. In a non-load mode, the transformer (T) is energized at all times by high voltage (H1 and H2). Transformer (T) connects negative low voltage (T3) to C15, B3, and E1 at all times. Then, the positive side (T4) of the low-voltage transformer (T) connects positive low voltage to A, the common contact C1 of the current monitoring relay device $A_R$, the common contact C4 of the third set of the changeover relay device $C_R$, and the common contact B5 of the latching relay device $B_R$. When the outlet encounters an electrical device, such as an electrical tool or an appliance, the electrical device connects the positive H1 and negative terminal H2 of the power outlet O. As such, low voltage electricity passes through the power outlet O via the electrical device, and when it encounters an electrical load from the electrical device, the electrical device serves as a switch to provide a low voltage path from T4 to C4, which is connected to C2 in the same relay, which connects to H2, which flows from H2 through the electrical device to H1, and from there makes its way to C13 to C11 from C11 to B5, which energizes $B_R$. When this occurs, we are in the load situation.

Once the trigger button B5 of the latching relay device is turned on, B8 and B7 are connected, which allows the flow of T4, positive low voltage, to be present at C14, which in turn energizes CR. As a result, the connection of C4 is switched from C2 to C3, the connection of C7 is switched from C5 to C6, the connection of C10 is switched from C8 to C9, and the connection of C13 is switched from C11 to C12. As such, the H1 positive high voltage power coming into the circuit then allows high voltage to be present across C12 and C13 to outlet O. The current flowing through H1 then energizes the current monitor relay, which connects contact A to contact B. Thus, positive low voltage is provided to AR, thereby energizing the relay. Consequently, it disconnects A1 from C1, connecting C1 to B1. Now, high voltage current flow through the electrical device and the shock-proof outlet is in the full load mode.

When no load is present in the outlet (e.g., the on/off switch of the appliance is in the off position or the user lets go of the trigger switch completely), the current monitor relay disconnects contact A from contact B, which deenergizes $A_R$. When $A_R$ is deenergized, C1 connects to A1, which allows low voltage power to flow through $A_R$ from C1 to A1. When this happens C6 connects to C7, which connects to B4, which energizes the $B_R$ latching relay. When B4 has positive low voltage (T4), it causes the positive side of relay $B_R$ from B8 to B6, which represents the original configuration of the latching relay, and when this happens, C2 connects to C4, C5 connects to C7 (in other words it assumes its original no-load configuration, which allows it to go back to low voltage in the outlet).

The examples set forth above, in both the specification and the figures, are provided to give those of ordinary skill in the art with a complete disclosure and description of how to make and use the preferred embodiments of the present invention, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. An electrical safety device, for connection between a high voltage electrical power source and a load, comprising:
   an outlet comprising a positive voltage terminal and a negative voltage terminal;
   means for receiving a high voltage input from a high voltage electrical source;
   means for providing low voltage to the outlet from the source high voltage input, the low voltage being less than the source high voltage input;
   means for monitoring current flow across the outlet positive voltage terminal and the negative voltage terminal and providing an electrical output when such flow occurs, the current flow indicative of whether a load is connected to the outlet;
   a first means for switching from a first state to a second state when current flows across the outlet positive and negative terminals and providing an electrical output in the second state; and
   a second means for switching comprising a plurality of sets of contacts, the second switching means configured to change the plurality of contacts from a first state to a second state upon receiving an electrical input from the first switching means, and configured to provide a connection from the high voltage source to the outlet in the second state.

2. The device of claim 1, wherein the first switching means comprises a trigger button, a reset button, a first contact, a second contact, and a common contact, the common contact being electrically connected to a positive terminal of the low voltage providing means, wherein the common contact is connected to the first contact in the first state, and wherein the common contact is connected to the second contact in the second state, the first switching means configured to change to the second state when the trigger button is energized, and further configured to change to the first state when the reset button is energized.

3. The device of claim 2, wherein the current monitoring means comprises a current monitoring relay device comprising a switch, a first contact, a second contact, and a common contact, the common contact being electrically connected to a positive terminal of the low voltage providing means, the current monitoring relay device configured to open the switch causing the common contact to connect to the first contact when there is no high voltage current flow across the positive and negative terminals of the outlet, and further configured to close the switch causing the common contact to connect to the second contact when there is a high voltage current flow across the positive and negative terminals of the outlet, the current monitoring relay device being further configured such that connecting the common contact to the first contact provides positive low voltage to the first switching means reset button.

4. The device claim 3, wherein the second switching means comprises a first, second and third sets of contacts, and a switch, the first set of contacts comprising a first contact, a second contact, and a common contact, the first set of contacts configured such that the first contact in communication with the trigger button of the first switching means, the second contact is in communication with a positive terminal of the high voltage input receiving means, and the common contact is in communication with the positive voltage terminal of the outlet;
   wherein the second set of contacts of the second switching means comprises a second contact in communication with the first contact of the current monitoring means and further comprises a common contact in communication with the reset button of the first switching means;
   wherein the third set of contacts of the second switching means comprises a first contact in communication with the negative terminal of the high voltage power line and a common contact in communication with the positive terminal of the low voltage providing means;
   and wherein the switch of the second switching means is in communication with the second contact of the first switching means.

5. The device of claim 2, wherein the current monitoring means comprises a transformer having a high voltage input and a low voltage output, the high voltage input of the transformer being connected to the positive terminal of the outlet and the low voltage output of the transformer being connected with a reset button of the first switching means for providing a low voltage electrical output to the reset button of the first switching means when a high voltage current is flowing across the outlet terminals.

6. The device of claim 1, wherein the first switching means comprises a latching relay device.

7. The device of claim 1, wherein the second switching means comprises a changeover relay device.

8. The device of claim 1, wherein the first switching means is configured to switch to the second state when the trigger button is energized with a positive low voltage, and the first switching means is further configured to switch to the first state when the reset button is energized with a positive low voltage.

9. The device of claim 1, wherein the high voltage receiving means comprises a high voltage positive terminal and negative terminal.

10. The device of claim 5, wherein the second switching means connects the high voltage receiving means positive terminal to the positive terminal of the outlet when the second switching means is placed in the second state, and wherein the high voltage receiving means negative terminal is connected to the negative terminal of the outlet.

11. The device of claim 10, wherein the high voltage receiving means positive terminal and negative terminal are connected to the low voltage providing means.

12. The device of claim 1, wherein the second switching means comprises a positive switching contact and a negative switching contact, wherein each of the plurality of sets of contacts comprises a first set of contacts, a second set of contacts, and a third set of contacts, each set of contacts having a first contact, a second contact, and a common contact, and wherein the second switching means connects the common contact of each of the plurality of sets of switches from the first contact to the second contact when a voltage is provided to the positive switching contact from the first switching means.

13. The device of claim 12, wherein the voltage provided to the positive switching contact by the first switching means comprises a low positive voltage.

14. The device of claim 1, wherein the means for providing low voltage to the outlet comprises a voltage converter that receives the high input voltage from the source.

15. The device of claim 1, further comprising a current overload protection circuit for protecting against an overload current flowing across the outlet.

16. The device of claim 15, wherein the current overload protection circuit comprises a Reed current overload disconnect.

17. The device of claim 15, wherein the current overload protection circuit comprises a solid state device.

18. An electrical output device comprising:
an outlet having a positive terminal and a negative terminal;
a voltage converter comprising
    a high voltage input having a positive a terminal and negative terminal, and
    a low voltage output having a positive and negative terminal;
a current monitoring relay configured to monitor current flowing across the negative and positive terminals of the outlet indicating a device with a load is connected across the outlet, and configured to provide an electrical output when current flows across the outlet;
a latching relay comprising a trigger button, a reset button, a first contact, a second contact, and a common contact, wherein the common contact is in communication with the voltage converter low voltage output positive terminal; and
a changeover relay comprising a switch, a first set of switch contacts, a second set of switch contacts, and a third set of switch contacts, each set having a first contact, a second contact, and a common contact,
wherein the first contact of the first set of switch contacts is in communication with the latching relay trigger button, the second contact of the first set of switch contacts is in communication with the positive terminal of a high voltage power line, and the common contact of the first set of switch contacts is in communication with the negative terminal of the outlet;
wherein the second contact of the second set of switch contacts in communication with the output of the current monitoring relay device and the common contact is in communication with the reset button of the latching relay device;
wherein the first contact of the third set of the changeover relay is in communication with the negative terminal of the high voltage power line and the common contact is in communication with the positive terminal of the low voltage output; and
wherein the switch of the changeover relay device is in communication with the second contact of the latching relay device.

19. The electrical output device of claim 18, further comprising a current overload protection circuit.

20. An electrical safety device, for connection between a high voltage electrical power source and a load, comprising:
high voltage input terminals for receiving high voltage from a source, the high voltage input terminals comprising a positive terminal and a negative terminal;
output terminals for connecting to a load, the output terminals comprising a positive terminal and a negative terminal;
a voltage converter comprising a high voltage input side connected to the positive and negative high voltage input terminals, and a low voltage output side having a positive terminal and a negative terminal;
a current monitor device configured to monitor current flowing across the negative and positive output terminals and provide an electrical output if high voltage current is flowing across the output terminals, the current flow indicating a load is connected to the negative and positive output terminals;
a latching relay configured to switch from a first state to a second state when current flows across the positive and negative voltage output terminals, and provide an electrical output in the second state, and configured to receive the current monitoring device electrical output and reset from the second state to the first state based on the current monitoring electrical output; and
a changeover relay comprising a plurality of sets of contacts, the changeover relay configured to change the plurality of contacts from a first state to a second state upon receiving an electrical input from the latching relay, configured to provide a connection from the low voltage output side of the voltage converter to the output terminals in the first state, and configured to provide a connection from the high voltage source to the output terminals in the second state.

21. The device of claim 20, wherein the latching relay comprises a trigger button, a reset button, a first contact, a second contact, and a common contact, the common contact being electrically connected to the low voltage positive terminal of the voltage converter, wherein the common contact is connected to the first contact in the first state, and wherein the common contact is connected to the second contact in the second state, the latching relay configured to change to the second state when the trigger button is energized, and further configured to change to the first state when the reset button is energized.

22. The device of claim 21, wherein the current monitor device comprises a current monitoring relay device comprising a switch, a first contact, a second contact, and a common contact, the common contact being electrically connected to the low voltage positive terminal of the voltage converter, the current monitoring relay device configured to open the switch causing the common contact to connect to the first contact when there is no high voltage current flow across the output terminals, and further configured to close the switch causing the common contact to connect to the second contact when there is a high voltage current flow across the output positive and negative terminals, the current monitoring relay device being further configured such that connecting the common contact to the first contact provides positive low voltage to the latching relay reset button.

23. The device claim 22, wherein the changeover relay comprises a first, second and third sets of contacts, and a switch, the first set of contacts comprising a first contact, a second contact, and a common contact, the first set of contacts configured such that the first contact in communication with the trigger button of the latching relay, the second contact is in communication with a positive terminal of the high voltage input terminals, and the common contact is in communication with the positive voltage output terminal for connecting to a source;
wherein the second set of contacts of the changeover relay comprises a second contact in communication with the first contact of the current monitor device and further comprises a common contact in communication with the reset button of the latching relay;
wherein the third set of contacts of the changeover relay comprises a first contact in communication with the high voltage input negative terminal and a common contact in communication with the low voltage output positive terminal of the voltage converter;
and wherein the switch of the changeover relay is in communication with the second contact of the latching relay.

* * * * *